INVENTORS.
CHARLES W. BOGS,
JACK L. WRIGHT,
BY John B Davidson
ATTORNEY.

3,364,462
APPARATUS FOR ELIMINATING UNDESIRED
EVENTS ON TRACES OF SEISMOGRAMS
Charles W. Bogs and Jack L. Wright, Houston, Tex., assignors to Esso Production Research Company, a corporation of Delaware
Filed Apr. 4, 1966, Ser. No. 539,823
3 Claims. (Cl. 340—15.5)

ABSTRACT OF THE DISCLOSURE

Undesired events on traces of seismograms are eliminated by filtering each trace and varying the upper cutoff frequency as a function of time on the seismogram. A servomotor is used to vary the frequency controlling element of the filter. The speed of the servomotor is controlled as a nonlinear function of the seismic trace reproducing apparatus. A tapped potentiometer and a tapped transformer provide means for varying the speed of the servomotor and the time variation of the upper cut of frequency of the filter.

---

This invention relates generally to seismic prospecting, and more particularly to the elimination from seismograms of interfering and obscuring events that complicate the interpretation of seismograms.

In seismic prospecting, a seismic disturbance is created at or near the earth's surface, as by detonating explosive charges, by dropping a heavy weight to the surface of the earth, or by actuating an earth vibrator. The elastic waves thus created are transmitted through the earth and a least a portion of such waves passes downwardly through the earth and is reflected back to the earth's surface from the interfaces of subsurface strata because of discontinuities or variations in the elastic wave transmitting properties of such strata. Reflected wavelets reaching the earth's surface are detected by one or more seismic transducers, commonly called geophones or seismometers, at positions and locations spaced from the point where the seismic disturbance was initially produced. The geophone produces an electrical signal having a waveform substantially identical to the detected seismic wave. The electrical waves produced by the various geophones are recorded on a common time axis as a plurality of traces to form a seismogram. The seismic waves detected by the geophones are extremely complex in nature, being formed not only by reflected and refracted wavelets from various depths in the earth, but also from reflections from localized reflectors, multiply reflected reverberations in near surface earth strata, seismic waves produced by other surface sources such as the wind. The extraneous events interfere with the events of interest produced by reflected seismic waves to greatly complicate the interpretation of the seismogram.

It has been long known that the earth acts as a distributed filter to seismic waves. As seismic waves progress downwardly into the earth, the high frequency components thereof are reduced in amplitude and are progressively eliminated from the seismic waves. On seismograms, this is evidenced by the progressively lower frequency content of the reflections as one progresses along the time axis of the seismogram. Thus, events produced by shallow reflectors will generally have a much higher frequency content than events produced by deep reflectors.

According to one aspect of the present invention, the filtering action of the earth is measured to determine the upper frequencies transmitted by the earth at various depths therein. A putative curve of the upper cutoff frequency of seismic waves passing through the earth as a function of depth may thereupon be formed. Thereafter, a trace to be corrected may be divided into discrete sections along the time axis thereof, and all components of the trace can be removed from each section thereof above the upper cutoff frequency of the curve corresponding to said each section. This can be done by reproducing the trace as an electrical signal, initially re-recording all frequency components of the trace, and thereafter, at any given time, re-recording only those frequency components of the trace having a frequency less than the frequency passed by the earth at the depth corresponding to the depth at which reflection events would appear on the trace therefrom at the location on the time axis of the trace corresponding to said given time.

According to another aspect of the invention, apparatus for processing a trace of a reproduced seismogram to eliminate undesired events thereon comprises means for reproducing the trace as an electrical signal, and a filter for eliminating from the signal those frequencies above an upper cutoff frequency. Servo means are provided for controlling the element of the filter which controls the upper cutoff frequency, and means for controlling the servo means as a function of time to progressively reduce the upper cutoff frequency of the filter. Means is additionally provided for recording the output signal of the filter.

Objects and features not apparent from the above discussion will become evident upon consideration of the following detailed description of the invention taken in connection with the accompanying drawings, wherein.

Figure 1:
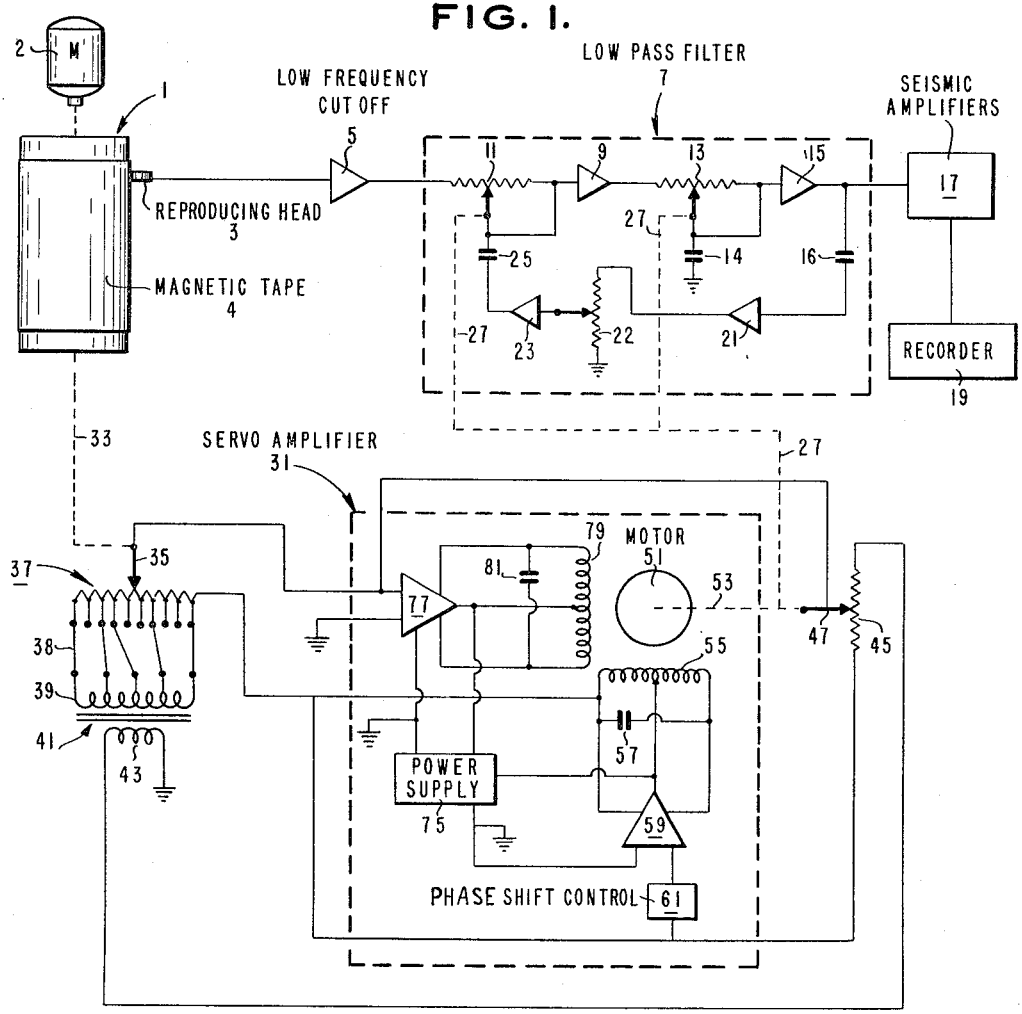
FIG. 1 is an electrical schematic diagram of a preferred embodiment of the invention.

With reference now to FIG. 1, there is illustrated a seismogram transport and reproducing means 1 which may be an apparatus using magnetic tape as the recording medium such as is commercially available. Such apparatus as illustrated reproduces as electrical signals seismogram traces recorded on a magnetic tape carried on a drum 1 adapted to be revolved by an electric motor 2. A magnetic reproducing head 3 is positioned in close proximity to the tape 4 carried by the drum so as to reproduce as electrical signals the electrical signals previously recorded in the form of traces on the tape 4. Alternatively, any other type of trace-reproducing means, such as those for reproducing as electrical signals traces recorded in variable density form on photographic film, may be utilized in connection with the invention. The output signal from the reproducing head 3 is coupled to an electrical amplifier 5 which includes a high-pass filter circuit for eliminating all frequency components of the electrical signal coupled thereto below a predetermined frequency. This low cutoff frequency filter may consist of a variable resistance-capacitor combination connected in such a manner as to form a high-pass filter of conventional design. The attenuation characteristics of a filter section may be approximately 12 db per octave, for example. Several sections of this high-pass filter may be connected in series to give greater attenuation rates of 24 db or 36 db per octave. The output of amplifier 5 is coupled to a low-pass filter 7 comprising serially connected amplifiers 9 and 15, the upper cutoff frequency of which is controlled by the circuit including potentiometers 11 and 13, the wipers of which are respectively connected to capacitors 25 and 14, and a feedback circuit including capacitor 16, amplifier 21, potentiometer 22, amplifier 23, and capacitor 25. Potentiometer 22 is connected to the output of amplifier 21 and controls the input signal to amplifier 23, and thus controls the amount of feedback from the output of amplifier 15 to the input of amplifier 9 through capacitor 25. Therefore, potentiometer 22 also controls the gain of filter section 7 and is normally adjusted to give filter section 7 a gain of approximately unity. The upper cutoff frequency of the circuit is controlled primarily by the values of potentiometers 11 and 13 and the values of capacitors 25 and 14. The attenuation characteristics of a filter section, such as 7, may be approximately 12 db per octave. Therefore, if it is desired to have an attenuation rate greater than 12 db per octave, such as 24 db or 36 db per octave, then, two or three filter sections, such as 7, should be connected in series. That is, one filter section is added in series for each 12 db per octave of attenuation desired. The rate at which the amplification of filter 7 drops off at the high frequency end of the pass band thereof is determined by the number of filter sections. Thus, the output of filter 7 is fed to one or more seismic amplifiers 17, the output signal of which is recorded by seismic recorder 19.

The position of the wipers of potentiometers 11 and 13, and thus the upper cutoff frequency of the filter 7, is controlled as a function of the rotation of the seismogram reproducing apparatus 1 by a servo means including servo amplifier 31, control potentiometer 37 coupled to reproducer 1 through a shaft or other suitable mechanical or electromechanical connection 33, transformer 41, feedback potentiometer 45, and servo output shaft or coupling 27. The servo amplifier 31 is of conventional design and comprises a servo motor 51 having control windings 79 and 55 respectively shunted by capacitors 81 and 57, a servo amplifier 59, the output of which is balanced and coupled across the split servo motor winding 55 and servo amplifier 77 having a balanced output coupled across the split servo winding 79. A D.C. power supply 75 energizes both servo amplifiers 77 and 59. Amplifier 59 has a resistive-capacitive network 61 coupled to the input thereof so that the amplifier 59 and the circuitry associated therewith can function as a phase shift oscillator to supply 400-cycle power to the servo system. The servo amplifier 31 may be of a type such as is manufactured by the Helipot Division of Beckman Instruments, Inc.

The output shaft 53 of servo motor 51 is connected to the wiper 47 of feedback potentiometer 45, and also to the wipers of potentiometers 11 and 13 so as to control the positions thereof. The wiper 47 of potentiometer 45 is connected to one input circuit of servo amplifier 77 and the wiper of potentiometer 37. The other input circuit of servo amplifier 77 is connected to ground. The primary winding 43 of transformer 41 is connected between one side of servo motor winding 55 and ground. The potentiometer 37, in addition to having a movable wiper 35, has a multiplicity of fixed taps which are adapted to be individually connected by jumper wires 38 to taps on the secondary winding 39 of trnsformer 41. As long as there is a differential voltage between the two input circuits to amplifier 77, a signal will be fed to servo motor winding 79 that will tend to turn servo motor 51 in a direction to adjust wiper 47 so as to minimize the difference between the signals applied to the input circuits of servo amplifier 77. Thus, when wiper 35 is moved by the rotation of seismogram reproducer 1, motor 51 will rotate to readjust wiper 47. At the same time, wipers of potentiometers 11 and 13 will be readjusted to vary the upper cutoff frequency of filter 7. Therefore, as seismogram reproducer 1 reproduces a trace along the time axis thereof, the wipers of potentiometers 11 and 13 will be continuously readjusted so as to lower the cutoff frequency of filter 7.

Manifestly, the voltage across the taps of the secondary winding of transformer 39 will be determined by the voltage applied to the input winding 43 thereof. By connecting the fixed secondary winding taps to various of the fixed taps on potentiometer 37, the voltage distribution across the potentiometer 37 can be varied at will. Transformer 41 could be replaced by several variable potentiometers which have one end connected to the taps of potentiometer 37 and the other end and the wiper connected to a D.C. voltage source in such a manner as to generate the necessary voltage function to be fed to the input of the servo amplifier 77. Then, one end of potentiometer 45 would be connected to the D.C. voltage source in such a manner that it would produce the necessary nulling voltage at the input of the servo amplifier 77.

Figure 2:
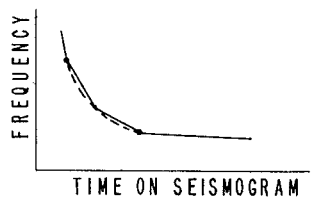
FIG. 2 is a coordinate presentation of the cutoff frequency as a function of time as measured along the time axis of the seismogram, which is useful in understanding the operation of the apparatus of FIG. 1.
Figure 3:
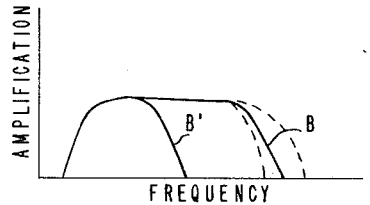
FIG. 3 is a coordinate presentation of the circuit as a function of frequency for the purpose of illustrating the effects of the additional number of sections of element 7 of FIG. 1.

The relationship between the upper cutoff frequency passed by the earth as a function of depth may be determined by various techniques. For example, a good approximation of such a relationship often may be had by experience only; that is, by previous seismic exploration in the area. Alternatively, if a borehole is available in the area, geophones may be lowered to various depths in the borehole and a seismic source, such as an earth vibrator, can be progressively activated to produce seismic waves of various frequencies, and the signals produced by the geophones may be observed to determine effect of frequency variation thereon, so that the cutoff frequency of seismic waves travelling from the earth's surface to that particular depth can be readily determined. From such information a putative curve of the upper cutoff frequency of seismic waves passing through the earth as a function of depth, such as is illustrated in FIG. 2 by the dotted line and the solid line continuation thereof, can readily be made. A sufficiently accurate approximation of this curve can be formed for filter 7 by adjusting the jumpers between the fixed taps of potentiometer 37 and the fixed taps of transformer secondary winding 39. Since the movement of wiper 35 will be directly proportional to the position of reproducing head 3 with respect to the time axis of a trace of the seismogram carried by seismic reproducing apparatus 1, and since the voltage at wiper 35 controls the cutoff frequency of filter 7 by repositioning the wipers of potentiometers 11 and 13 through the servo system, a curve such as illustrated by the solid lines of FIG. 2 can be formed which is indicative of the cutoff frequency of filter 7 as a function of time on the time axis of the seismogram. Assuming that the number of filter sections have been connected in series to produce a slope at the high frequency cutoff, such as indicated by the portion B of the amplification versus frequency curve of the filter 7, a pass band of the filter 7 will be progressively narrowed as the drum of the reproducing apparatus 1 rotates until the high frequency cutoff at the end of the seismic trace is as indicated by line B' of FIG. 3. The effect will be that events on the seismogram having high frequencies will be eliminated from the seismogram when the events occur at times on the seismogram corresponding to the arrival time of singly reflected seismic events from relatively great depths.

Having described the principle of the invention and the best mode in which it is contemplated to apply that principle, it is to be understood that the apparatus described is illustrative only and that other means can be employed without departing from the true scope of the invention defined in the following claims.

What is claimed is:

1. Apparatus for processing a trace of a reproducible seismogram resulting from an artificial seismic disturbance at or near the earth's surface, comprising:

signal reproducing means including a rotatable drum member for reproducing the trace as an electrical signal;

electrical filter means connected to said first means for eliminating frequencies above an upper cutoff frequency of the filter, said filter including a variable circuit element for varying said upper cutoff frequency;

first potentiometer means having a moveable tap and a plurality of fixed taps including end terminals;

second potentiometer means having a moveable tap electrically connected to said moveable tap of said first potentiometer means and one end of terminal connected to one end of said first potentiometer means;

transformer means having a secondary winding with a plurality of taps thereon, and a primary winding;

servo means including a servomotor and a servoamplifier for controlling said servomotor;

said servomotor being mechanically connected to said variable circuit element and to said moveable tap of said second potentiometer means for controlling the upper cutoff frequency of said filter and simultaneously repositioning said moveable tap of said second potentiometer;

means for connecting the free terminal of said second potentiometer to one terminal of said transformer primary winding, the other terminal being connected to ground;

and means for selectively selecting individual taps of said transformer secondary to individual taps on said first potentiometer means;

said moveable tap of said first potentiometer means being connected to said signal reproducing means on said potentiometer as a function of rotation of said drum member.

2. The apparatus of claim 1 wherein the variable circuit element can vary the upper cutoff frequency of the filter from about 100 cycles per second to about 10 cycles per second.

3. The combination of claim 1 wherein the variable circuit element is a resistance-capacitance circuit having a variable resistance member connected to said servo means.

References Cited

UNITED STATES PATENTS

| | | | |
|---|---|---|---|
| 2,420,672 | 5/1947 | Maillet | 340—15.5 |
| 2,725,534 | 11/1955 | Hemphill. | |
| 2,911,600 | 11/1959 | Bardeen | 340—15.5 X |
| 2,952,833 | 9/1960 | Bardeen | 340—15.5 |

OTHER REFERENCES

Ser. No. 254,743, Maillet (A.P.C.), published May 18, 1943.

Karplus et al., Analog Methods, McGraw-Hill, c. 1959, pages 49–52.

BENJAMIN A. BORCHELT, *Primary Examiner.*

SAMUEL FEINBERG, *Examiner.*

R. M. SKOLNIK, *Assistant Examiner.*